US012435867B2

(12) United States Patent
Sharrah

(10) Patent No.: US 12,435,867 B2
(45) Date of Patent: Oct. 7, 2025

(54) FLASHLIGHT ASSEMBLY WITH ROTARY SWITCH AND BODY ENCLOSING SEALED SUBFRAME

(71) Applicant: Streamlight, Inc., Eagleville, PA (US)

(72) Inventor: Jonathan R. Sharrah, Phoenixville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 18/659,840

(22) Filed: May 9, 2024

(65) Prior Publication Data

US 2024/0295311 A1 Sep. 5, 2024

Related U.S. Application Data

(60) Continuation of application No. 18/109,717, filed on Feb. 14, 2023, now abandoned, which is a continuation of application No. 17/550,038, filed on Dec. 14, 2021, now Pat. No. 11,585,521, which is a continuation of application No. 17/390,403, filed on Jul. 30, 2021, now Pat. No. 11,287,121, which is a (Continued)

(51) Int. Cl.

| | |
|---|---|
| ***F21S 9/02*** | (2006.01) |
| ***F21L 2/00*** | (2006.01) |
| ***F21L 4/00*** | (2006.01) |
| ***F21V 15/01*** | (2006.01) |
| ***F21V 23/04*** | (2006.01) |
| ***F21V 31/00*** | (2006.01) |
| ***F21V 31/03*** | (2006.01) |

(52) U.S. Cl.

CPC ............ *F21V 23/0414* (2013.01); *F21L 2/00* (2013.01); *F21L 4/005* (2013.01); *F21S 9/02* (2013.01); *F21V 15/01* (2013.01); *F21V 31/005* (2013.01); *F21V 31/03* (2013.01)

(58) Field of Classification Search

CPC ........ F21V 15/01; F21V 31/005; F21V 31/03; F21V 23/0414; G05G 1/10; H01H 3/08; H01H 19/36; H01H 19/46; H01H 21/40; H01H 21/44; H01H 21/46

See application file for complete search history.

(56) References Cited

U.S. PATENT DOCUMENTS 762,720 A * 6/1904 Hubert ...................... F21L 4/00 429/97
1,649,590 A * 11/1927 Henke .................... H01H 21/36 200/431

(Continued)

FOREIGN PATENT DOCUMENTS

EP 0274671 A1 * 7/1988 ............. H01H 19/62
EP 2081201 A2 * 7/2009 ............. H01H 19/63

*Primary Examiner* — Ismael Negron

(74) *Attorney, Agent, or Firm* — Quarles & Brady LLP; James J. Aquilina

(57) ABSTRACT

A lighting device comprising a light source, a power source, a switch assembly, a subframe having an interior volume and a sealing surface that surrounds a first opening in the subframe, the interior volume of the subframe being sized to receive the power source, a membrane that seals to the sealing surface of the subframe, and a vent that acts to prevent liquids from entering the interior volume of the subframe via a second opening, while permitting for gases to be released from the interior volume through the vent.

13 Claims, 14 Drawing Sheets

Related U.S. Application Data division of application No. 17/032,575, filed on Sep. 25, 2020, now Pat. No. 11,181,257.

(56) References Cited

U.S. PATENT DOCUMENTS

| | | | | | |
|---|---|---|---|---|---|
| 1,934,214 | A * | 11/1933 | Stimson | F21L 4/00 | 362/208 |
| 2,355,982 | A * | 8/1944 | Linhardt, Jr. | F21V 23/0414 | 362/186 |
| 2,385,639 | A * | 9/1945 | Packer | F21L 2/00 | 362/196 |
| 2,503,287 | A * | 4/1950 | Moore | F21L 4/00 | 362/206 |
| 3,259,709 | A * | 7/1966 | Hemmens | H01H 21/40 | 200/275 |
| 3,278,921 | A * | 10/1966 | Horino | F21V 23/0414 | 340/331 |
| 3,878,344 | A * | 4/1975 | Lockard | H01H 23/006 | 74/567 |
| 4,286,311 | A * | 8/1981 | Maglica | F21V 19/047 | 362/205 |
| 4,797,517 | A * | 1/1989 | Ohashi | F21V 23/04 | 200/60 |
| 4,800,472 | A * | 1/1989 | Burton | F21V 31/00 | 362/189 |
| 4,870,550 | A * | 9/1989 | Uke | F21V 15/01 | 362/202 |
| 6,926,422 | B2 * | 8/2005 | Bruwer | F21V 23/0414 | 362/165 |
| 10,378,702 | B2 * | 8/2019 | Sharrah | F21V 23/0428 | |
| 11,181,257 | B1 * | 11/2021 | Sharrah | F21S 9/02 | |

* cited by examiner

FLASHLIGHT ASSEMBLY WITH ROTARY SWITCH AND BODY ENCLOSING SEALED SUBFRAME

CROSS-REFERENCE TO RELATED APPLICATION(S)

The present application is a continuation of U.S. patent application Ser. No. 18/109,717, filed on Feb. 14, 2023, which is a continuation of U.S. patent application Ser. No. 17/550,038, filed Dec. 14, 2021 (now issued as U.S. Pat. No. 11,585,521), which is a continuation of U.S. patent application Ser. No. 17/390,403, filed Jul. 30, 2021 (now issued as U.S. Pat. No. 11,287,121), which is a divisional of U.S. patent application Ser. No. 17/032,575, filed Sep. 25, 2020 (now issued as U.S. Pat. No. 11,181,257), all of which are incorporated herein by reference in their entireties.

FIELD OF THE DISCLOSURE

The present disclosure relates to the field of portable lighting devices, and more particularly, to a handheld flashlight assembly with variable operating modes, a temporary surge mode, and a sealed electronics compartment.

BACKGROUND

Flashlight assemblies having a sealed electronics compartment are known in the art. Such flashlight assemblies often have high-profile sealed electronics compartments that include adhesives or compression-type seals that span across a gap between housing members and/or fasteners. These seals can be bulky, expensive to produce, and/or unreliable.

Flashlight assemblies having pushbutton actuation and mode selection are also known in the art. Many of these flashlight assemblies are limited to bimodal operating states.

Accordingly, there is a need for improved portable lighting devices that overcome these and other drawbacks of the prior art devices.

BRIEF DESCRIPTION OF THE DRAWINGS

The lighting device according to the present disclosure is further described with reference to the accompanying drawings, in which.

SUMMARY OF THE INVENTIVE CONCEPTS

Figure 1:
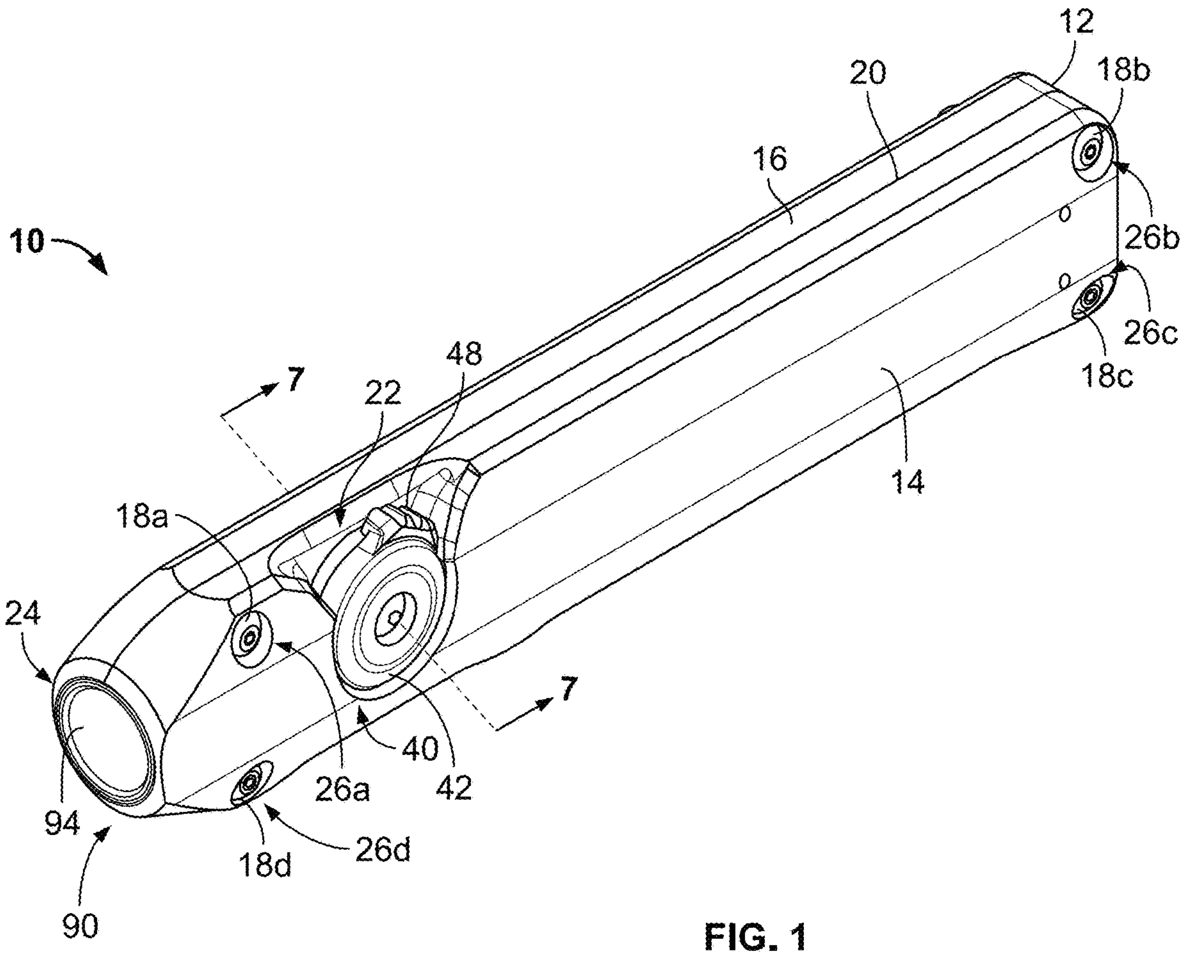
FIG. 1 is a front perspective view of an embodiment of a flashlight assembly according to the present disclosure.

In one respect, the inventive concept is a lighting device comprising a light source having a first state of operation and a second state of operation, a power source, at least one button, the at least one button being depressible, wherein the light source, the power source, and the at least one button are electrically coupled together, and a switch assembly, the switch assembly comprising a wheel that is engageable by a user from an exterior of the lighting device; a spring having at least one spring arm, and a cam that is rotatably fixed to the wheel, the cam having a plurality of detents circumferentially arranged therein, each of the detents of the plurality of detents being capable of receiving at least a portion of the spring therein, wherein the switch assembly is rotatable between a first position in which the at least one spring arm is located within a first detent of the plurality of detents and a second position in which the at least one spring arm is located within a second detent of the plurality of detents, wherein in the first position the cam does not depress the at least one button, resulting in the light source being placed in its first state of operation, and wherein in the second position the cam at least partially depresses the at least one button, resulting in the light source being placed in its second state of operation.

In another respect, the inventive concept is a lighting device comprising a light source; a power source, the power source being electrically coupled to the light source; a switch assembly that is engageable by a user from an exterior of the lighting device; a subframe having an interior volume and a sealing surface that surrounds an opening in the subframe, the opening being sized to allow for insertion of the power source into the interior volume of the subframe through the opening, the power source being located entirely within the interior volume; a seal having a perimeter, the perimeter being attached to the sealing surface such that the opening in the subframe is fluid-impermeable; and a body, the body enclosing the subframe and at least a portion of the light source.

In yet another respect, the inventive concept is a method of assembling a lighting device, the method comprising: placing a power source entirely interior to an interior volume of a subframe through an opening located in the subframe, the subframe further comprising a sealing surface that surrounds the opening; heat-welding a perimeter of a seal to the sealing surface of the subframe to create a fluid-impermeable seal about the opening; placing a light source and the subframe and the seal into a body, the light source being electrically coupled to the power source; and closing the body.

DETAILED DESCRIPTION

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being "connected" or "coupled" to another element, it can be integral with the other element, directly connected or coupled to the other element, or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments, unless noted to the contrary.

Referring now generally to FIGS. 1-8, one embodiment of a portable lighting device in the form of a flashlight assembly 10 according to the present disclosure will be described in detail. In this embodiment, the flashlight assembly 10 includes a housing 12, a switch assembly 40, and a light assembly 90. In some embodiments the housing 12 is comprised of aluminum, although other suitable materials may be used in alternative embodiments. In the present embodiment, the housing 12 includes a first body 14 and a second body 16 that can be secured together via a plurality of body screws 18*a*-18*d*, leaving a seam 20 between the first body 14 and second body 16. Each of the body screws 18*a*-18*d* extends through a respective fastener hole 26*a*-26*d* formed in the first body 14 and engages a respective one of a plurality of threaded holes 28*a*-28*d* formed in the second body 16. In this embodiment, each of the fastener holes 26*a*-26*d* is countersunk so that the heads of the body screws 18*a*-18*d* are nested within the first body 14. The housing 12 has a maximum height 30 and a maximum width 32 (excluding the pocket clip 150), which in this embodiment have a ratio of their measured dimensions of 5:3. The first body 14 further includes a switch recess 22 that is dimensioned to receive a wheel 42 of the switch assembly 40. The flashlight assembly 10 further includes a pocket clip 150. The pocket clip 150 includes a clip body 152 and a securement flange 154 that is securable to either the first body 14 or the second body 16 via fasteners 156*a*, 156*b* (see also small mounting holes for fasteners on both the first body 14 and the second body 16, which are not labeled, in FIGS. 2 and 3), to accommodate either dexterity of preference by the user.

Figure 2:
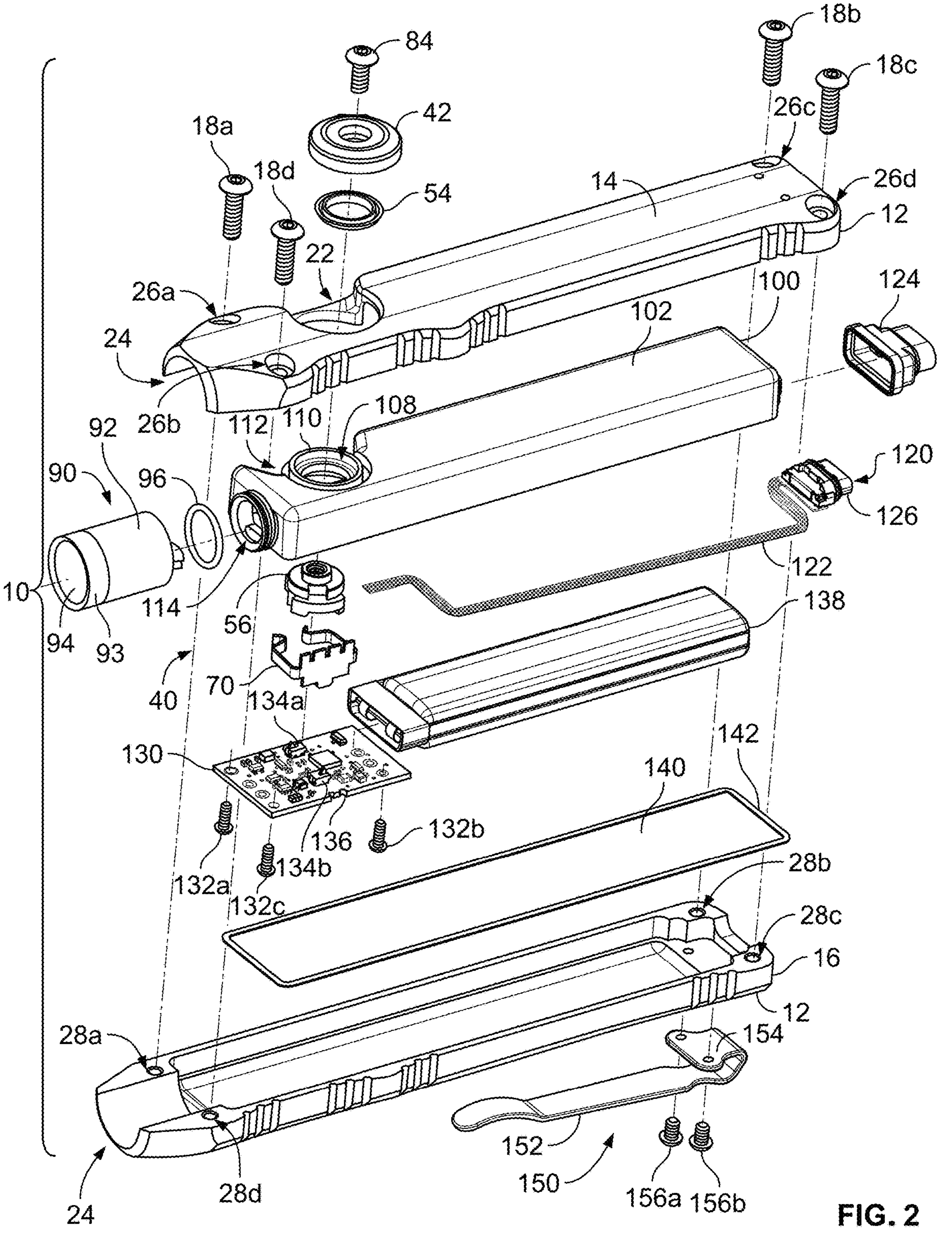
FIG. 2 is an exploded top perspective view thereof.
Figure 3:
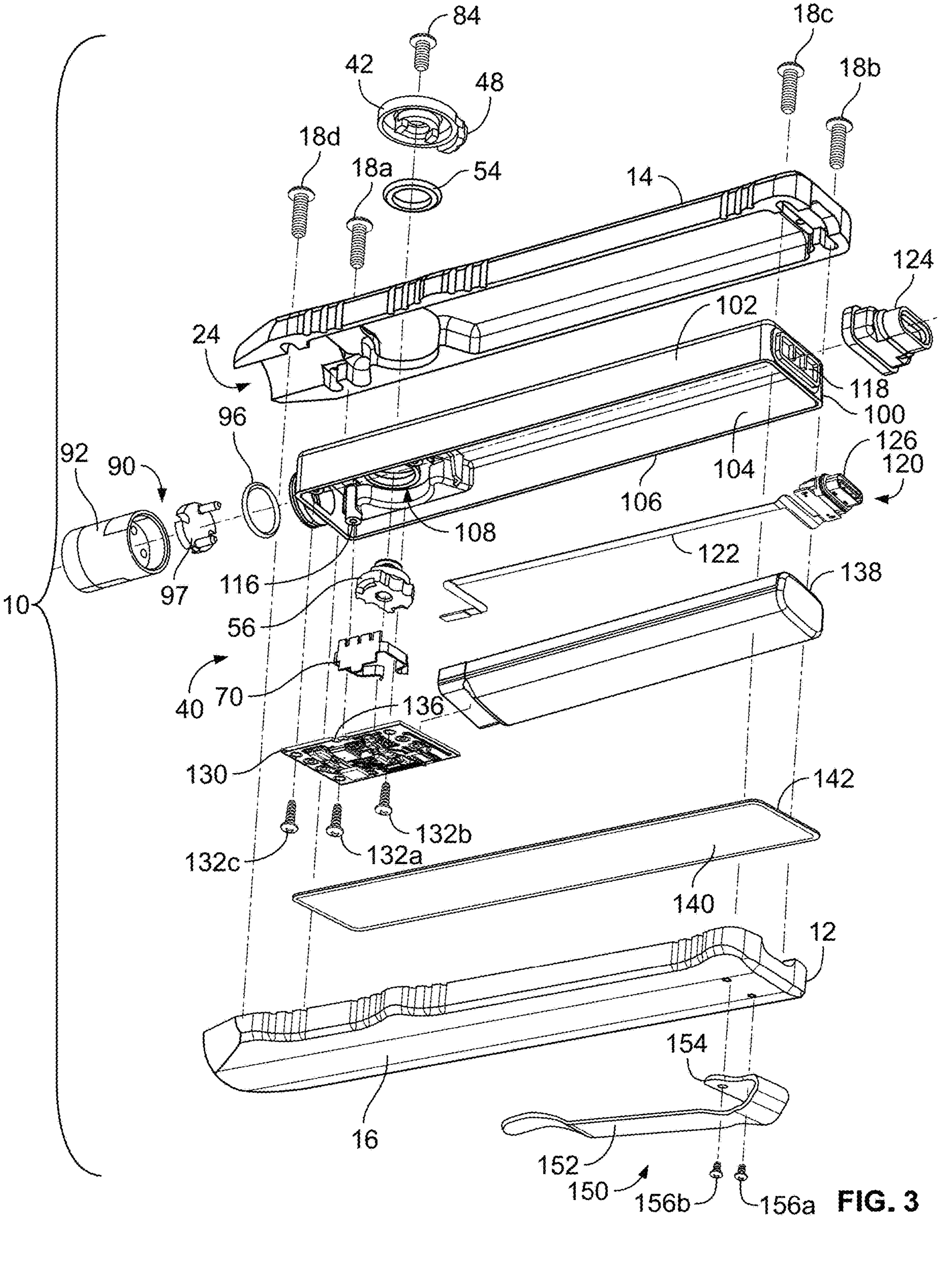
FIG. 3 is an exploded bottom perspective view thereof.

The light assembly 90 includes a heatsink 92 and a reflector 93 that in this embodiment are enclosed within an interior volume defined by the housing 12, and a lens 94 located at one side of the reflector 93 that protects one or more light sources (for example one or more LEDs, not shown) located within the reflector 93. In this embodiment the reflector 93 is threadedly connected to the heatsink 92, with an O-ring (not shown) located between the mated interior perimeters thereof to act as a waterproof seal. As illustrated in FIGS. 1-3, each of the first body 14 and the second body 16 form a portion of a light aperture 24. The reflector 93 is secured proximate to the light aperture 24 such that the lens 94 sits within the light aperture 24 and is visible from an exterior of the housing 12 such that light can be emitted from the light aperture 24, while liquidproof seals are maintained for the heatsink 92 via the O-ring that is not illustrated and at the light opening 114 via O-ring 96.

The flashlight assembly 10 according to one embodiment further includes a subframe 100 that encases most of the electronic components of the flash light assembly 10. In one embodiment, the subframe 100 is comprised of plastic and includes an exterior 102, an interior volume 104, and a sealing surface 106 that extends around the entire perimeter of an opening 103 located on one side of the subframe 100. Other materials for the subframe (e.g., metal) are possible in alternative embodiments. In the present embodiment, the subframe 100 has an approximately rectangular cross-sectional shape, though other cross-sectional shapes (including circular and non-circular cross-sectional shapes) are possible in alternative embodiments of the flashlight assembly 10. The subframe 100 further comprises a switch opening 108, a light opening 114, and a tail opening 118. The switch opening 108 includes a stem 110 that extends from a recessed portion 112 of the switch opening 108. The stem 110 is dimensioned to extend partially into the switch recess 22 of the first body 14 and is circular in shape to provide a radial sealing surface for placement of the V-ring 54, as will be described below in further detail. Each of the openings of the subframe 100, i.e., the switch opening 108, the light opening 114, the tail opening 118, and the opening 103 surrounded by the sealing surface 106, are configured to be sealed such that the interior volume 104 is isolated from the exterior 102, such that fluids (both gas and liquids, e.g., water) are prevented from entering the interior volume 104 of the subframe 100 where they could contact the electronics contained therein. Such sealing mechanisms will be described in detail below.

The subframe 100 is dimensioned to house a portion of the switch assembly 40, a portion of a universal serial bus (USB) assembly 120, a printed circuited board (PCB) assembly 130, and a battery 138. The switch assembly 40 includes the wheel 42, a V-ring 54, a cam 56, a spring 70, and a fastener 84. The V-ring 54 is stretched and radially mounted around a center shaft of the wheel 42 (i.e., exterior to the protrusions 50*a*, 50*b* on the wheel 42), and the V-ring 54 then sits within the interior of the stem 110, thus creating a liquid-impermeable seal between the wheel 42 and the interior volume 104 of the subframe 100. The geometry of the V-ring 54 (owing to its approximate "V"-shape in cross section) creates the liquid-proof seal while also allowing for heat that is generated within the interior volume 104 of the subframe 100 to be vented exterior to the lighting assembly 10. Said another way, the V-ring 54 creates a bi-directional liquid-impermeable but uni-directional gas-permeable seal (i.e., from the interior of the subframe 100 to the exterior thereof). Additional features of the switch assembly 40 will be described in detail below. Although in the present embodiment the wheel 42 is approximately circular in shape, in other embodiments it may be provided in other shapes.

The USB assembly 120 includes a USB printed control board (PCB) 122 and a USB housing 124 that houses a USB connector 126. The USB PCB 122 is electrically connected to the PCB assembly 130 and the battery 138. The USB housing 124 is configured to connect to an exterior USB power source (not shown) via the USB connector 126 to charge the battery 138, which is configured as a rechargeable battery and serves as the power source for illuminating the light assembly 90. The USB assembly 120 may also be used to allow for data transmission to the flashlight assembly 10 (e.g., a firmware update) and/or provide the ability to charge another external device using the energy stored in the battery 138. The light assembly 90, which, according to one embodiment, includes a light emitting diode (LED) assembly 97. During assembly of the flashlight assembly 10, the light assembly 90 is placed proximate to the exterior 102 of the subframe 100 at the light opening 114 and temporarily secured in place via compression of an O-ring 96 around the light opening 114, and then more permanently held in place by the compression and friction that is applied to the exterior of the light assembly 90 by the first body 14 and second body 16 when they are placed together to form the housing 12. The light assembly 90 is electrically coupled to the PCB assembly 130 through the light opening, and the PCB assembly 130 is secured proximate to the interior volume 104 of the subframe 100. The O-ring 96 is disposed between the heatsink 92 of the light assembly 90 and the light opening 114 of the subframe 100. The O-ring provides a liquid-proof seal between the light assembly 90 and the subframe 100 at the light opening 114.

The PCB assembly 130 is secured to the subframe 100 via fasteners **132*a*-132*c* that each engage a respective one of a plurality of threaded holes 116*a*-116*c* formed in the interior volume 104 of the subframe 100. The PCB assembly 130 further includes circuit elements 134*a*, 134*b*, each of which includes a respective button 135*a*, 135*b* located thereon that selectively engage with the cam 56** at varying operating positions, as will be described in greater detail below.

Figure 4:
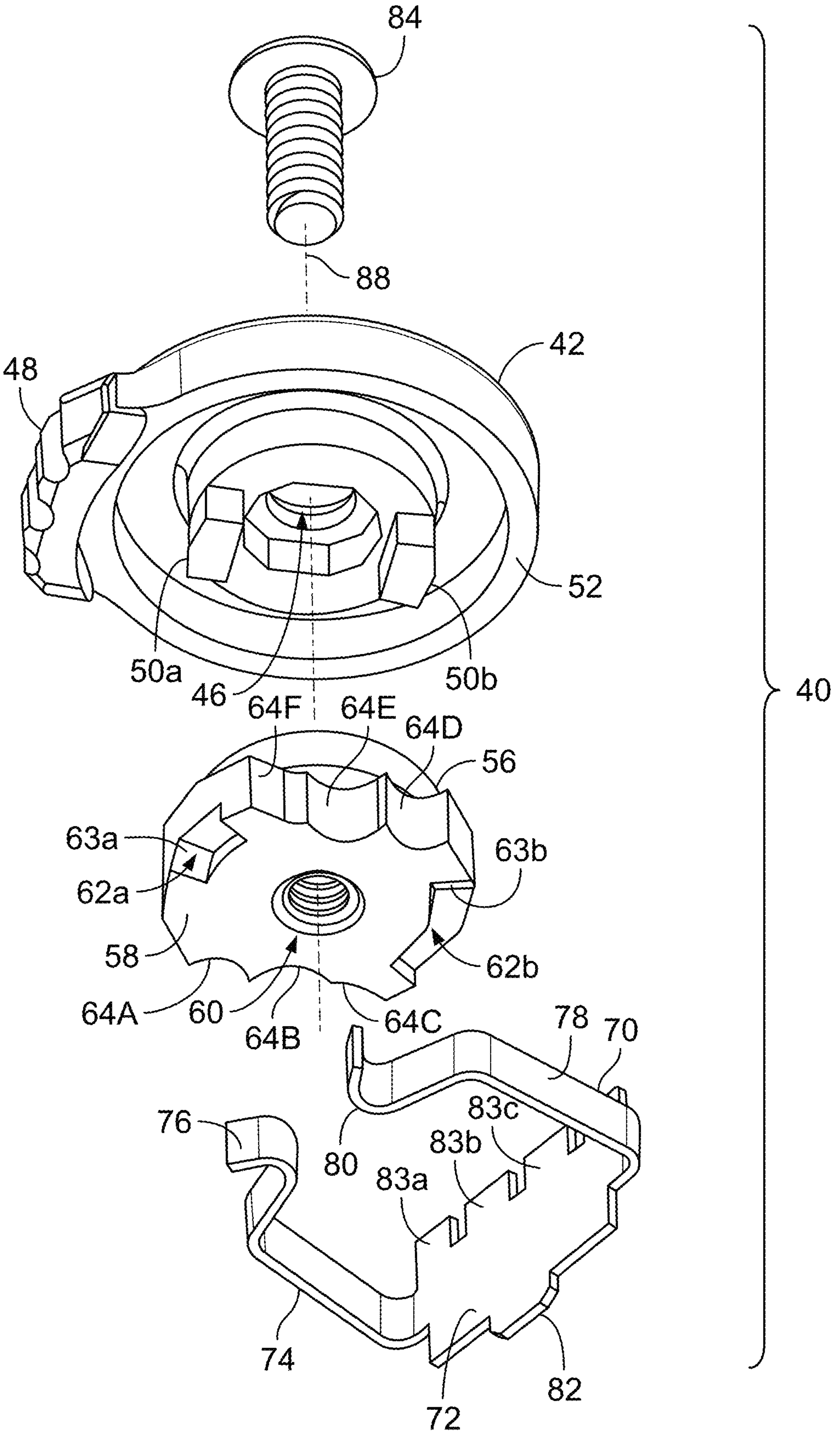
FIG. 4 is an exploded bottom perspective view of a switch assembly of the flashlight assembly of FIG. 1.

Referring now to FIG. 4, details of the switch assembly 40 according to one embodiment will be described in detail. The wheel 42 includes a clearance hole 46, a finger ridge 48, protrusions **50*a*,50*b*, and a collar 52. The clearance hole 46 provides access for the fastener 84 to extend through the wheel 42 and threadedly engage the cam 56 to secure the wheel 42 to the cam 56. The finger ridge 48 extends radially from a sector of the wheel 42 to provide a user with a grip surface to rotatably translate the wheel 42 between operating positions, for example using their thumb. The protrusions 50*a,b* engage corresponding recesses (not shown in FIG. 4, partially shown in FIG. 2) located on the cam 56 to prevent rotation between the wheel 42 and the cam 56, so that as the wheel 42 is rotated, the cam 56 rotates accordingly. The collar 52 extends axially downward from an outer radius of the wheel 42. The collar 52 is dimensioned to receive the stem 110 to—in combination with the V-ring 54—provide a seal between the wheel 42 and the subframe 100**.

The cam 56 includes a cam body 58 and a threaded hole 60 extending therethrough to receive the fastener 84. The cam body 58 includes circuit control recesses **62*a*, 62*b* and ramped surfaces 63*a*, 63*b* that selectively engage the buttons 135*a*, 135*b* located atop the circuit elements 134*a*, 134*b* at varying operating positions as the wheel 42 (and therefore the cam 56, which is rotatably fixed to the wheel 42) is rotated about axis 88. The cam body 58 further includes cam recesses 64A-F, which serve as detents for receipt of the spring arms of the spring 70, as further described below. Each of cam recesses 64A, 64B, 64D, and 64E extend a first depth into the cam body 58 and each of cam recesses 64C and 64F extend a second depth into the cam body 58. In the illustrated embodiment, the first depth is greater than the second depth. In this embodiment, each of the cam recesses 64A, 64B, 64D, and 64E have a relatively deep, arcuate shape, and each of the cam recesses 64C and 64F has a relatively shallow, approximately arcuate shape. Cam recess 64A is located opposite cam recess 64D, cam recess 64B is located opposite cam recess 64E, and cam recess 64C is located opposite cam recess 64**F.

The spring 70 includes a spring plate 72, a first spring arm 74 having a first curved foot 76, and a second spring arm 78 having a second curved foot 80. The first curved foot 76 is located directly opposite the second curved foot 80. The spring plate 72 includes a projection 82 that is dimensioned to engage a corresponding notch 136 formed in the PCB assembly 130, and a plurality of projections **83*a*-83*c* that engage complementary-shaped tabs (not shown) located on the interior side of the subframe 100. The engagement of the projection 82 with the notch 136 and the engagement of the projections 83*a*-83*c* with the tabs located on the subframe 100 keeps the spring 70 fixedly in place so that the first spring arm 74 and second spring arm 78 are permitted to flex without the spring plate 72** shifting.

Figure 5C:
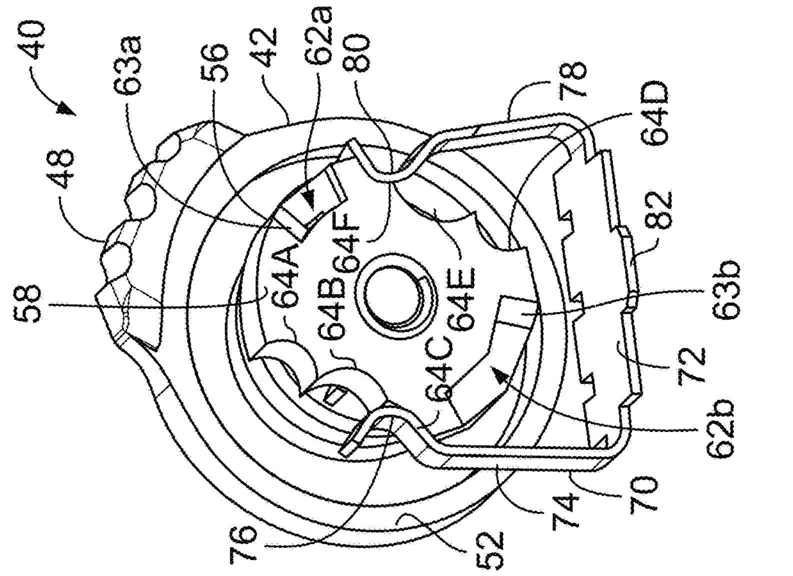
FIG. 5C is an interior side view of the switch assembly of FIG. 4 in a third operating position.
Figure 5B:
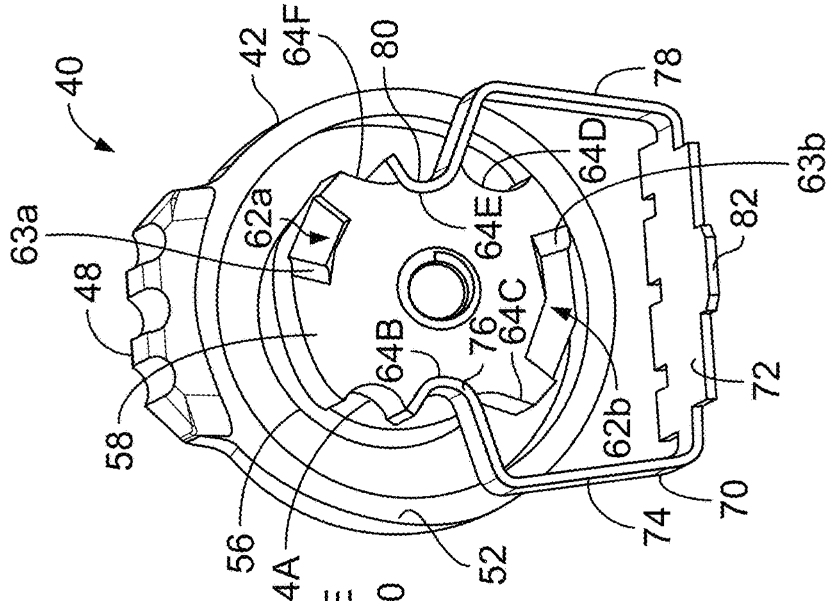
FIG. 5B is an interior side view of the switch assembly of FIG. 4 in a second operating position.
Figure 5A:
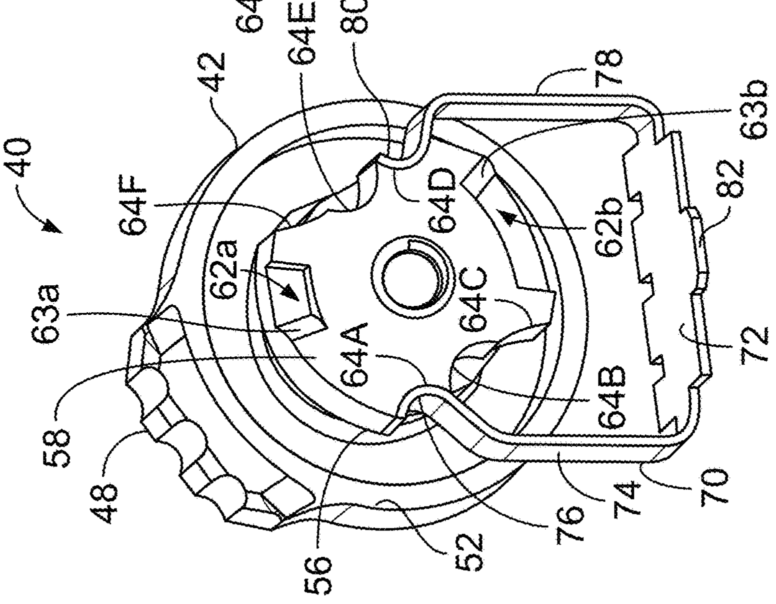
FIG. 5A is an interior side view of the switch assembly of FIG. 4 in a first operating position.
Figure 6:
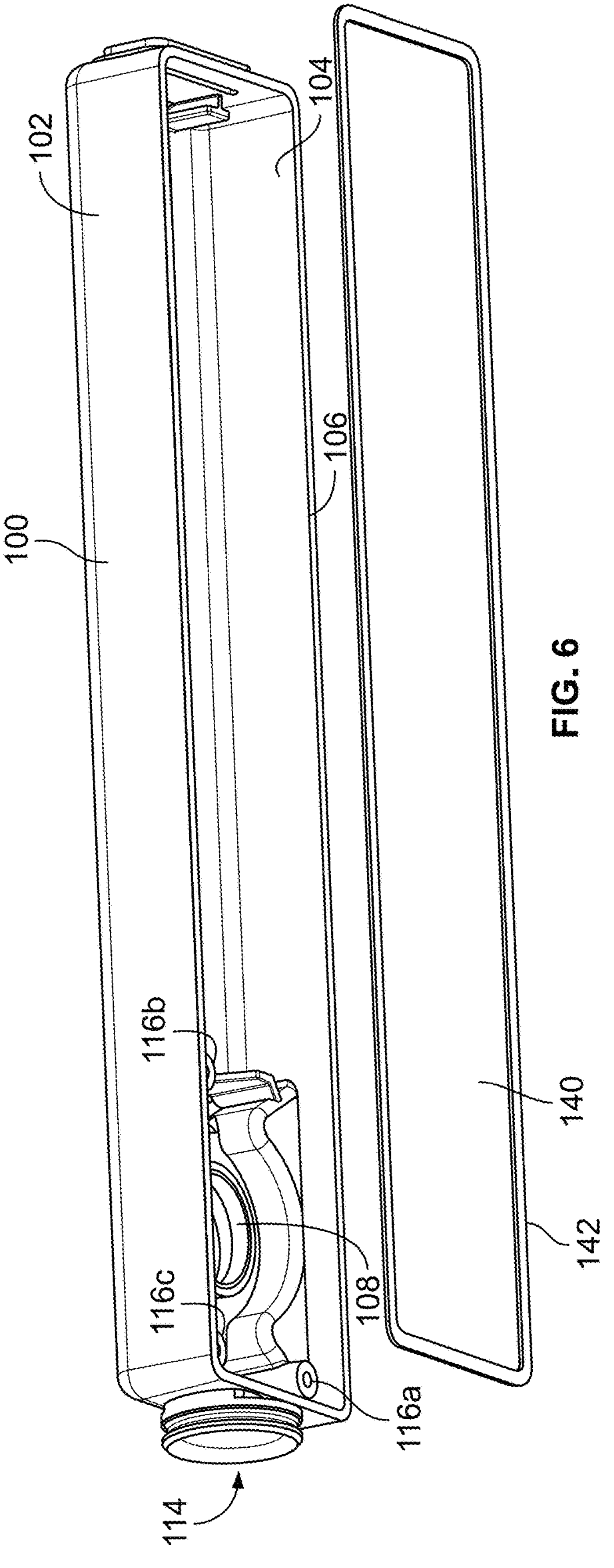
FIG. 6 is an exploded bottom view of a subframe and a seal of the flashlight assembly of FIG. 1.

Referring now to FIGS. 5A-5C, the various operating positions of the switch assembly 40 will now be described in detail. In the first operating position, illustrated in FIG. 5A, the first curved foot 76 is seated in cam recess 64A and the second curved foot 80 is seated in cam recess 64D. In this position, the alignment of the buttons **135*a*, 135*b* of the circuit elements 134*a*, 134*b* within the circuit control recesses 62*a*, 62*b* results in neither of the buttons 135*a*, 135*b* being depressed, thus corresponding correspond to an OFF mode where there is approximately zero current flowing through the PCB assembly 130, and therefore no light emitted through the lens 94. In this position, the first curved foot 76 is firmly engaged within cam recess 64A and the second curved foot 80 is firmly engaged within cam recess 64D, such that the cam 56 will stay in this rotational position—in this position corresponding with a "constant OFF" state—even when the user is not contacting the switch assembly 40**.

In the second operating position, illustrated in FIG. 5B, the first curved foot 76 is seated in the cam recess 64B and the second curved foot 80 is seated in cam recess 64E. As can be seen in FIG. 4, the circuit control recess **62*b* has a greater length than the circuit control recess 62*a*, such that in the position shown in FIG. 5B, the button 135*a* engages the ramped surface 63*a* and is therefore depressed, while the button 135*b* remains within the extended portion of the circuit control recess 62*b* and is not depressed. This second position corresponds to an ON mode wherein a first amount of current flows through the PCB assembly 130 and a first intensity of light is emitted through the lens 94. In use, the user can engage the finger ridge 48 and rotate the wheel 42 approximately 30 degrees Clockwise with respect to the orientation shown in FIG. 5A (i.e., counterclockwise with respect to the orientation shown in FIG. 1) to switch from the OFF mode to the ON mode. When the cam 56 is rotated from the position shown in FIG. 5A to the position shown in FIG. 5B, the user must overcome the spring force applied by the first curved foot 76 and the second curved foot 80 into the respective cam recess 64A,64D until the curved feet 76,80 are forced outwardly and then snap into place within the respective cam recess 64B,64E. In the position shown in FIG. 5B, the first curved foot 76 is firmly engaged within cam recess 64B and the second curved foot 80 is firmly engaged within cam recess 64E, such that the cam 56 will stay in this rotational position—in this position corresponding with a "constant ON" state—even when the user is not contacting the switch assembly 40. The user can then disengage from the finger ridge 48 and the flashlight assembly 10 will remain in the ON mode (i.e., in a constant-on state) without continued force (i.e., without an additional pressing force) applied to the wheel 42 of the switch assembly 40**.

In the third operating position, illustrated in FIG. 5C, the first curved foot 76 is seated in cam recess 64C and the second curved foot 80 is seated in cam recess 64F. In this position, while button 135*a* remains depressed against the cam 56, the button 135*b* engages the ramped surface 63*b* and is therefore also depressed. This third position corresponds to a TURBO mode configured as a temporary surge mode in which a second, greater amount of current flows through the PCB assembly 130 and a second, higher intensity light, as compared to the ON mode, is emitted through the lens 94. In use, the user can engage the finger ridge 48 and rotate the wheel 42 approximately 30 degrees Clockwise with respect to the orientation shown in FIG. 5B (counterclockwise with respect to the orientation shown in FIG. 1) to switch to TURBO mode and produce a brighter light than what is produced in the constant-ON mode position of FIG. 5B. When the cam 56 is rotated from the position shown in FIG. 5B to the position shown in FIG. 5C, the user must overcome the spring force applied by the first curved foot 76 and the second curved foot 80 into the respective cam recess 64B,64E until the curved feet 76,80 are forced outwardly and then move into place within the respective cam recess 64C,64F. In the position shown in FIG. 5C, the first curved foot 76 is loosely engaged within cam recess 64C and the second curved foot 80 is loosely engaged within cam recess 64F, such that the cam 56 will not stay in this rotational position when the user is not actively applying an additional force to the wheel 42 of the switch assembly 40, and the cam 56 will instead be biased to return the switch assembly 40 to the constant-ON position of FIG. 5B.

Whenever the user wants the benefit of the temporary TURBO mode, they can continue to actively engage the finger ridge 48 to maintain the position of the wheel 42 in the position shown in FIG. 5C. Said another way, the user must actively apply an additional pressing force of sufficient value to the wheel 42 to maintain the switch assembly 40 in its temporary TURBO mode. Correspondingly, the user can disengage from the finger ridge 48 and the cam 56 (i.e., remove the additional pressing force) and the wheel 42 will be urged to return to the position of the second operating position (i.e., the constant-ON state of FIG. 5B) under the biasing force of the first spring arm 74 and the second spring arm 78. Said another way, the design of the spring 70 and cam 56 allows for the switch assembly 40 to employ a momentary action to allow for a temporary surge light mode.

In other embodiments, other degrees and direction of rotation between an ON, OFF, and/or TURBO mode are possible. For example, the wheel can be rotated between approximately 5 degrees and 180 degrees, or between approximately 10 degrees and 60 degrees. In other embodiments, there can be other combinations of operating modes that correspond to rotational positions of the wheel 42. For example, the ON mode may correspond to the first operating position where the first curved foot 76 is seated in cam recess 64A and the second curved foot 80 is seated in cam recess 64D and likewise the OFF mode may correspond to the second operating position where the first curved foot 76 is seated in cam recess 64B and the second curved foot 80 is seated in cam recess 64E. In still further embodiments, more than three modes of the light are possible, and one or more increased light-intensity modes made be configured to be "constant-ON" capable.

Referring back to the present embodiment, the flashlight assembly 10 further includes a seal 140 having a perimeter 142. The perimeter 142 is dimensioned to engage the sealing surface 106 of the subframe 100. In one embodiment, the seal 140 is configured as a plastic membrane. The seal 140 is secured to the subframe 100 by heat-welding the perimeter 142 of the seal 140 to the sealing surface 106 of the subframe 100. The welded plastic seal between the perimeter 142 and the sealing surface 106 provides an impermeable barrier between the exterior 102 and the interior volume 104 of the subframe 100 proximate to the sealing surface 106. The use of a plastic membrane as the seal 140 that is heat-welded to the subframe 100 permits for the elimination of the use of adhesives or compression-type seals across one or more long gaps between fasteners, thus simplifying the construction of these seals, reducing costs, and allowing for effective seals to be more easily provided for non-circular shaped seal areas. The use of a plastic membrane for the seal 140 also permits for the seal 140 to have an extremely low profile (see sectional view of FIG. 7), thus saving space within the assembly of the flash light assembly 10. Still further, the seal 140 is flexible, which permits the battery 138—which in this embodiment is a lithium polymer-type battery—to swell and expand during its lifetime without destroying or reducing the effectiveness of the impermeable barrier formed by the seal 140, while also allowing for the controlled venting of the battery cavity (i.e., internal volume 104) through a properly designed V-ring vent 54, rather than disturbing the waterproof characteristic of the seal 140.

Figure 7:
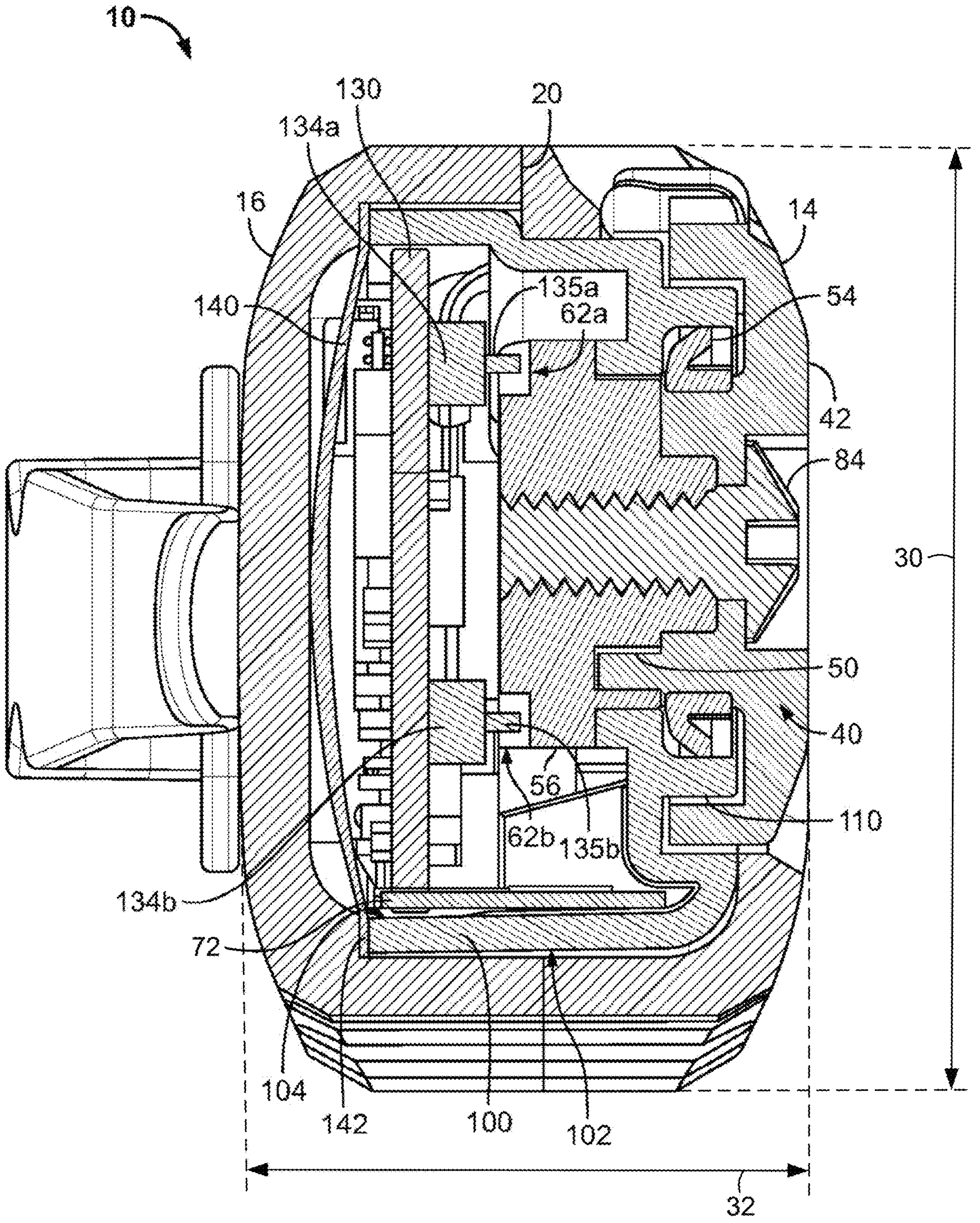
FIG. 7 is a cross sectional side view of the flashlight assembly of FIG. 1, taken along line 7-7 thereof.
Figure 8:
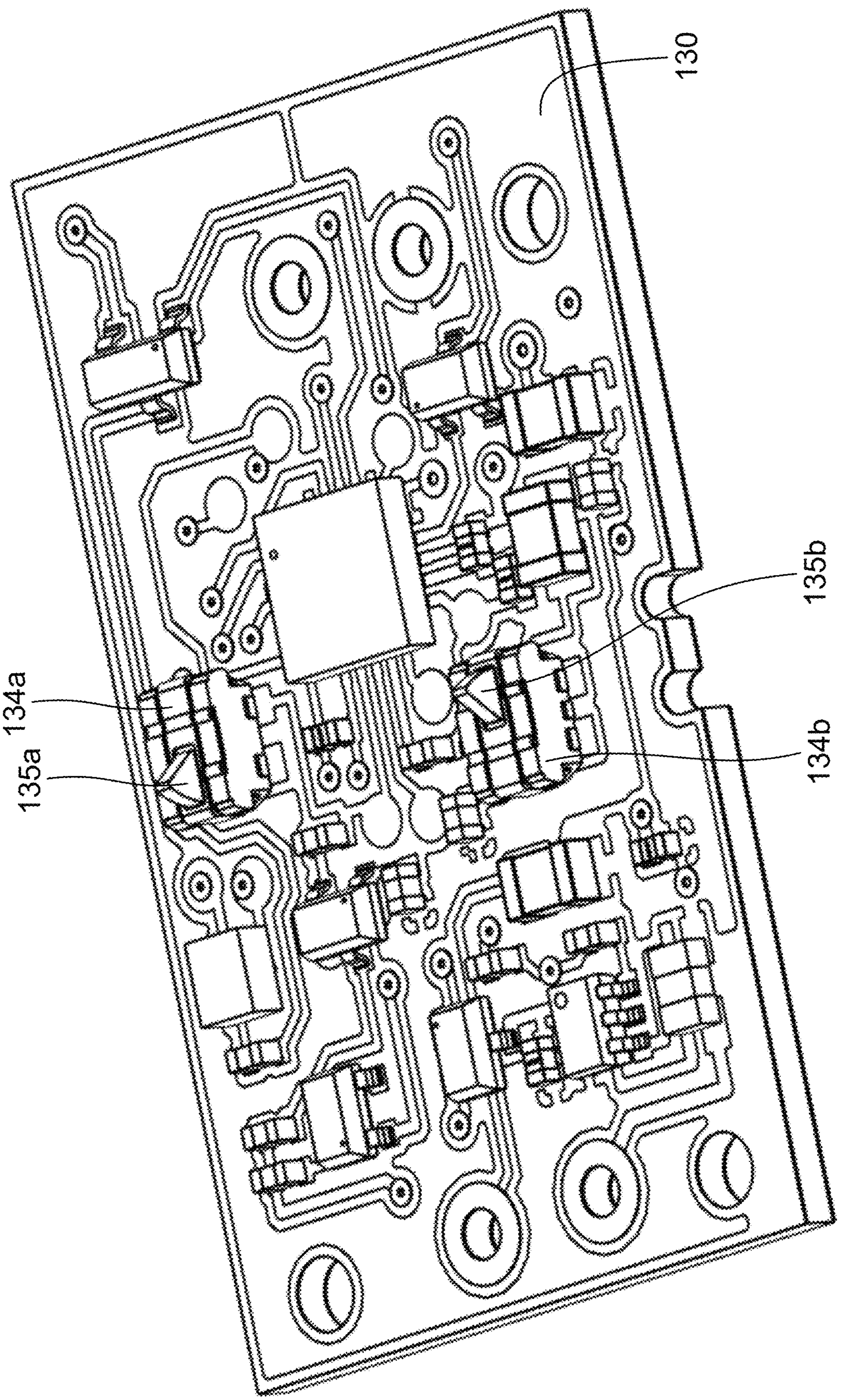
FIG. 8 is a close-up perspective view of a printed circuit board assembly according to the flashlight assembly of FIG. 1.
Figure 9:
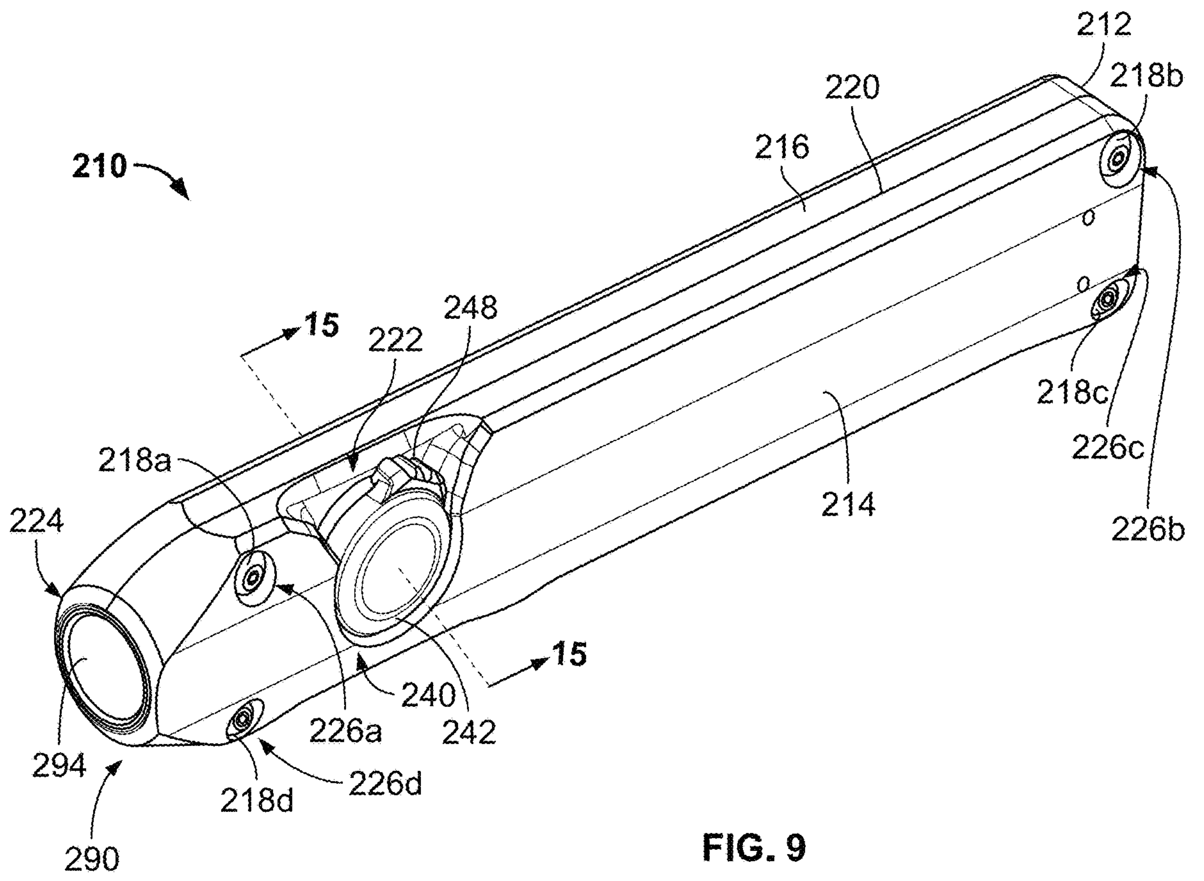
FIG. 9 is a front perspective view of another embodiment of a flashlight assembly according to the present disclosure.
Figure 10:
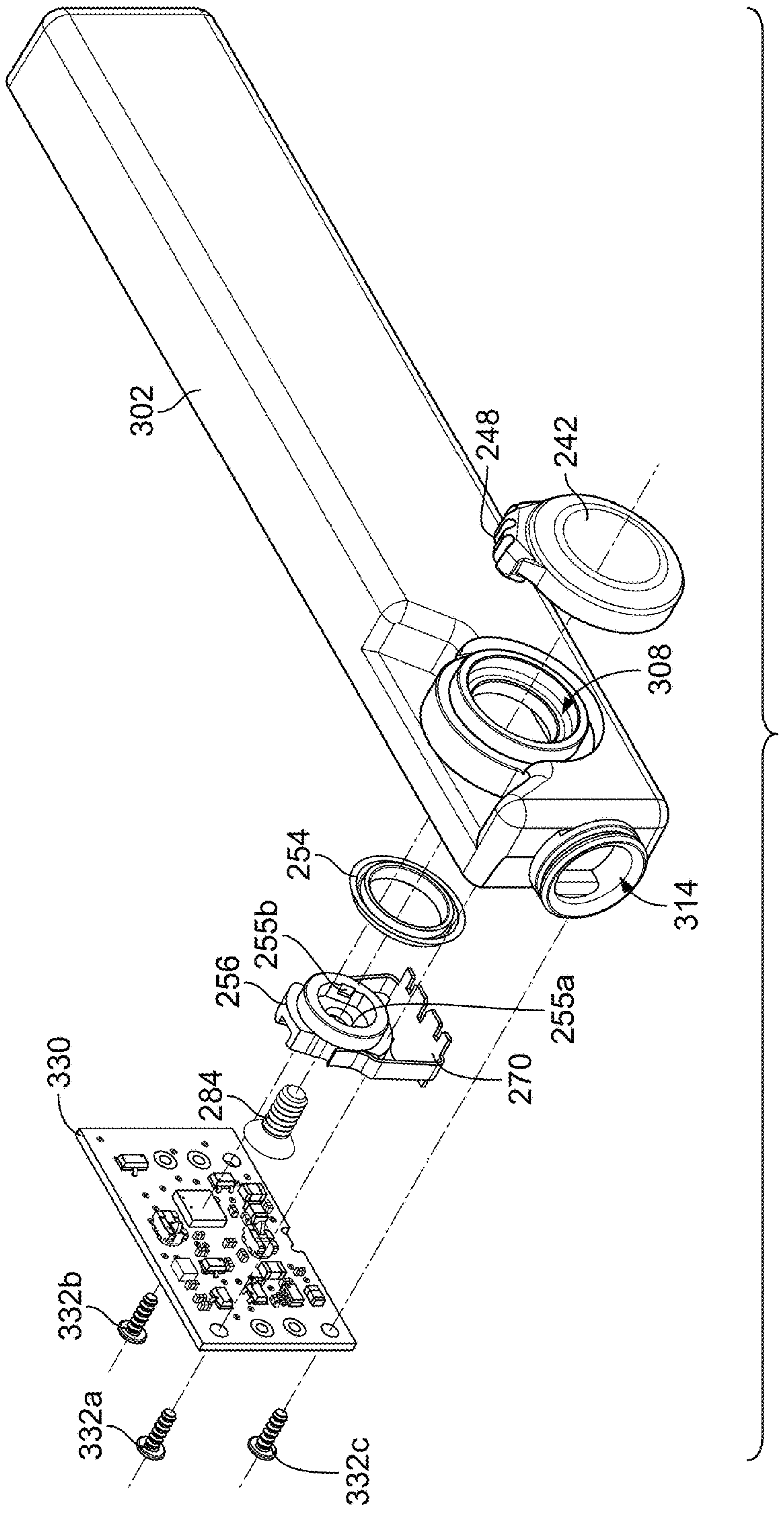
FIG. 10 is an exploded view of internal components thereof, including a switch assembly and a subframe of the flashlight assembly.
Figure 11:
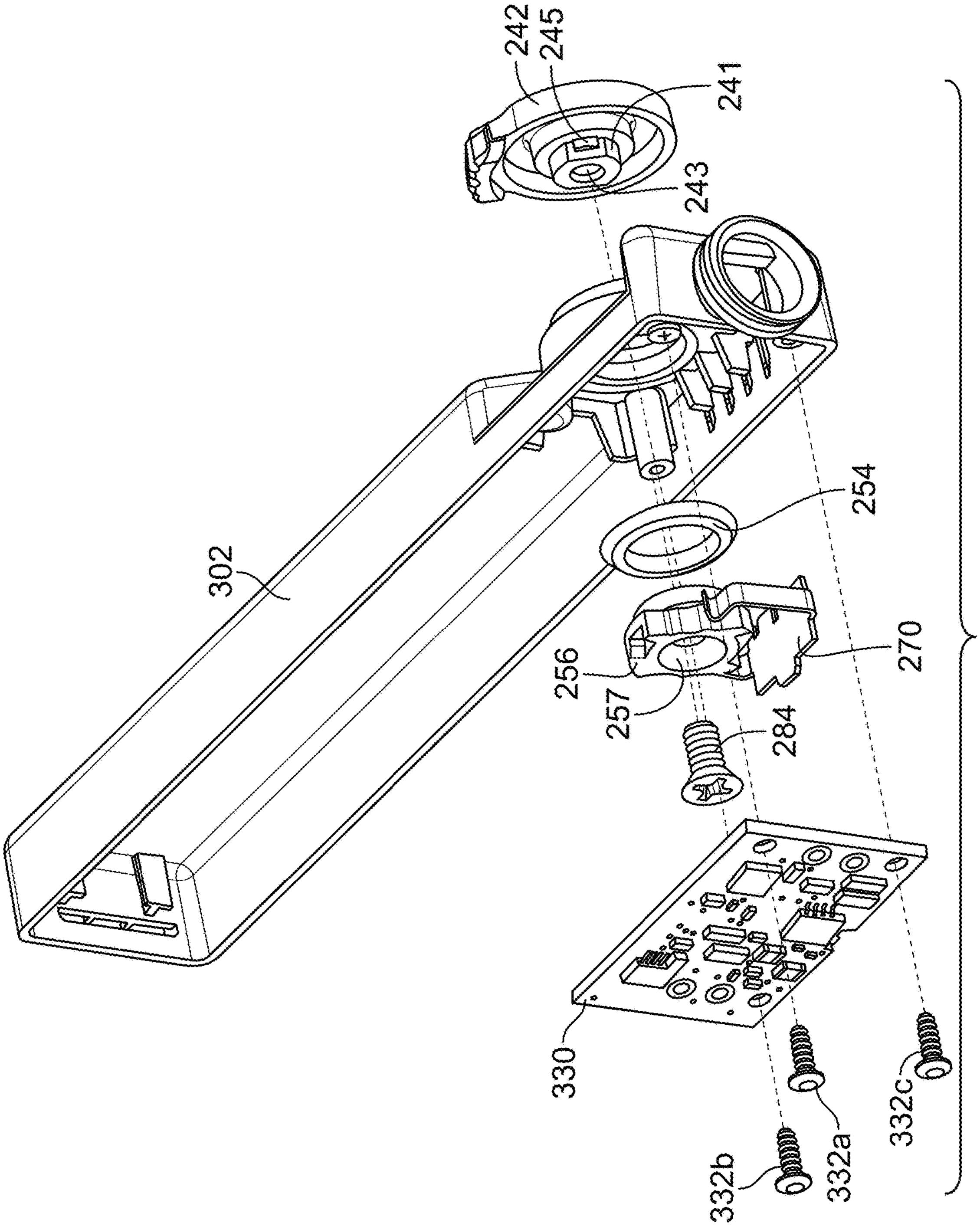
FIG. 11 is another exploded view thereof.
Figure 13:
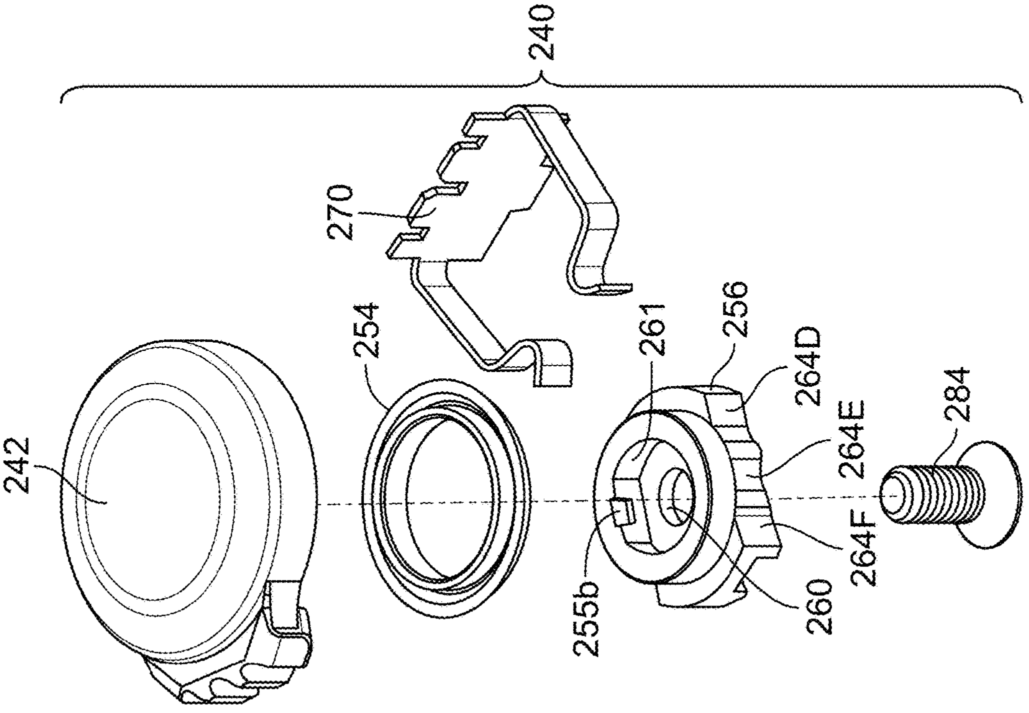
FIG. 13 is another exploded view thereof.

As described above, the subframe 100 is dimensioned to house a portion of the switch assembly 40, a portion of the USB assembly 120, the PCB assembly 130, and the battery 138. The seal 140, along with the V-ring 54 and the O-ring 96, provide a sealing barrier between an exterior of the subframe 100 and the components housed therein that are susceptible to damage from outside contaminants, such as for example dust or moisture, while permitting for appropriate venting of the internal volume 104 to the exterior of the flashlight assembly 10 via the V-ring 54. As illustrated in FIG. 7, the seal 140 is fully enclosed within the housing 12 and provides a low-profile sealing arrangement for the components housed within the subframe 100 that is not visible from the exterior of the housing 12 of the flashlight assembly 10.

Referring now generally to FIGS. 9-15, another embodiment of a portable lighting device in the form of a flashlight assembly 210 according to the present disclosure will be described in detail. In this embodiment, elements that are shared with—i.e., that are structurally and/or functionally identical to—elements present in the first embodiment (flashlight assembly 10) are represented by reference numerals increased by a value of 200. In the interest of brevity, some features of this embodiment that are shared with the embodiment of FIGS. 1-8 are numbered in FIGS. 9-15, but are not discussed in the specification.

Figure 12:
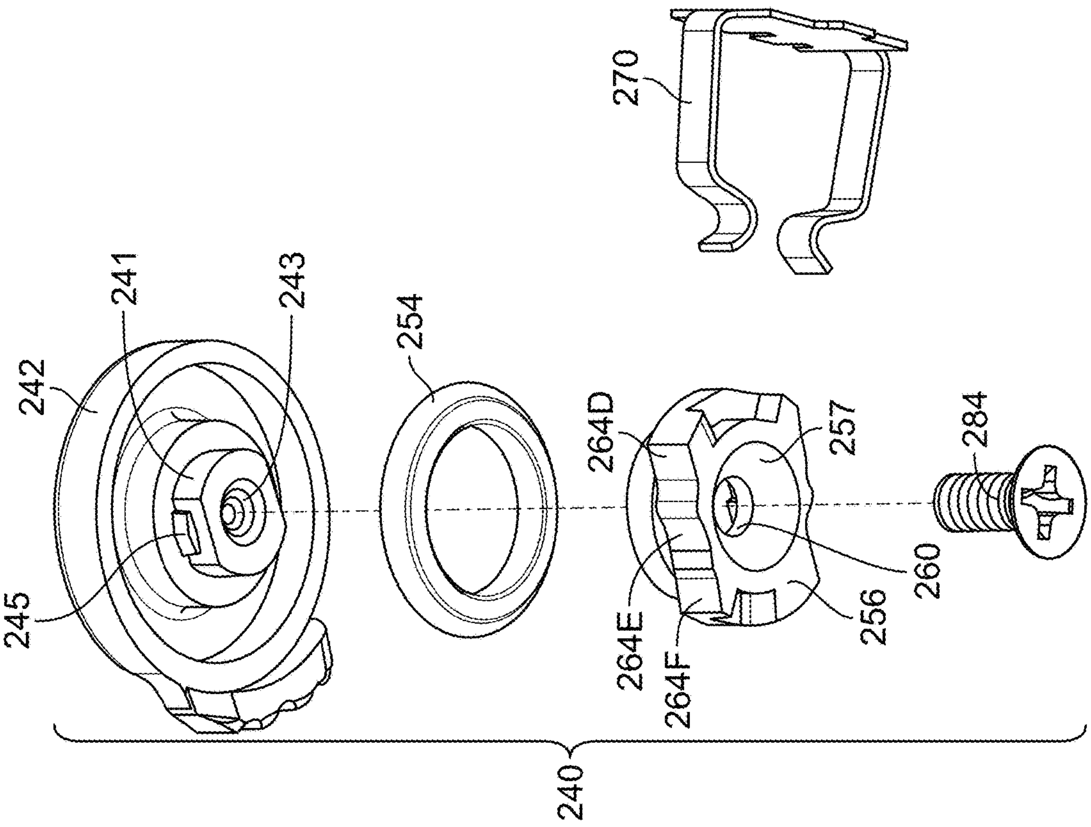
FIG. 12 is an exploded view of the switch assembly of the flashlight assembly of FIG. 9.
Figure 14:
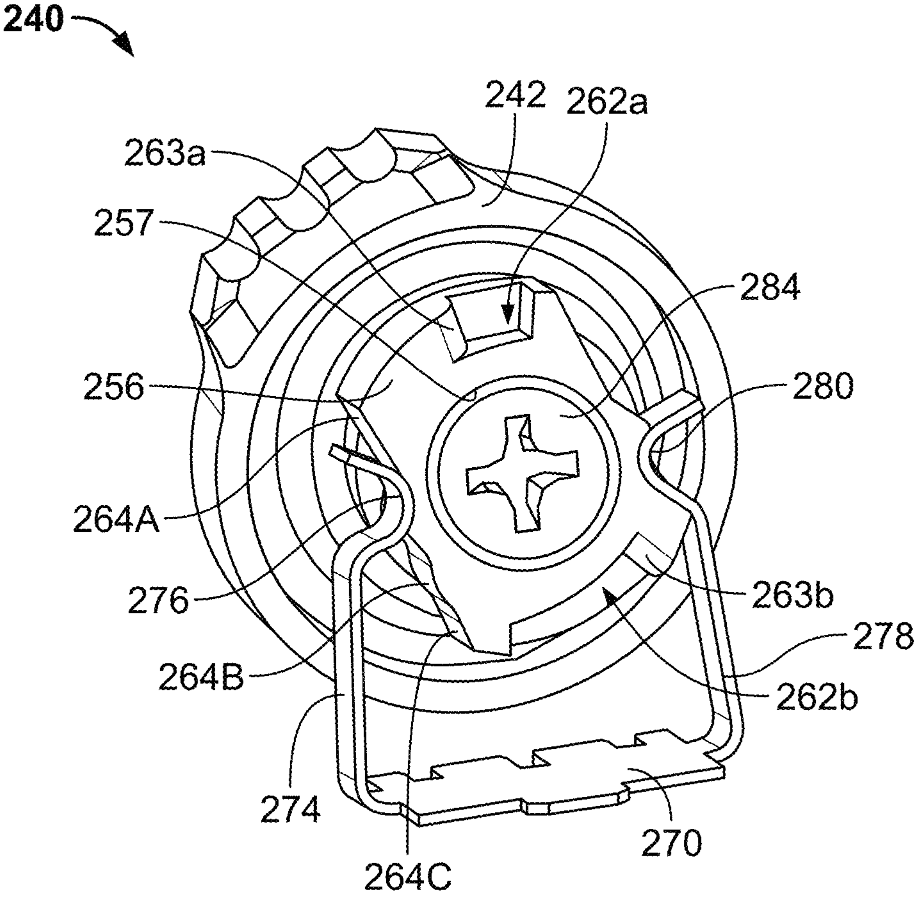
FIG. 14 is a view of the assembled switch assembly of FIG. 12.
Figure 15:
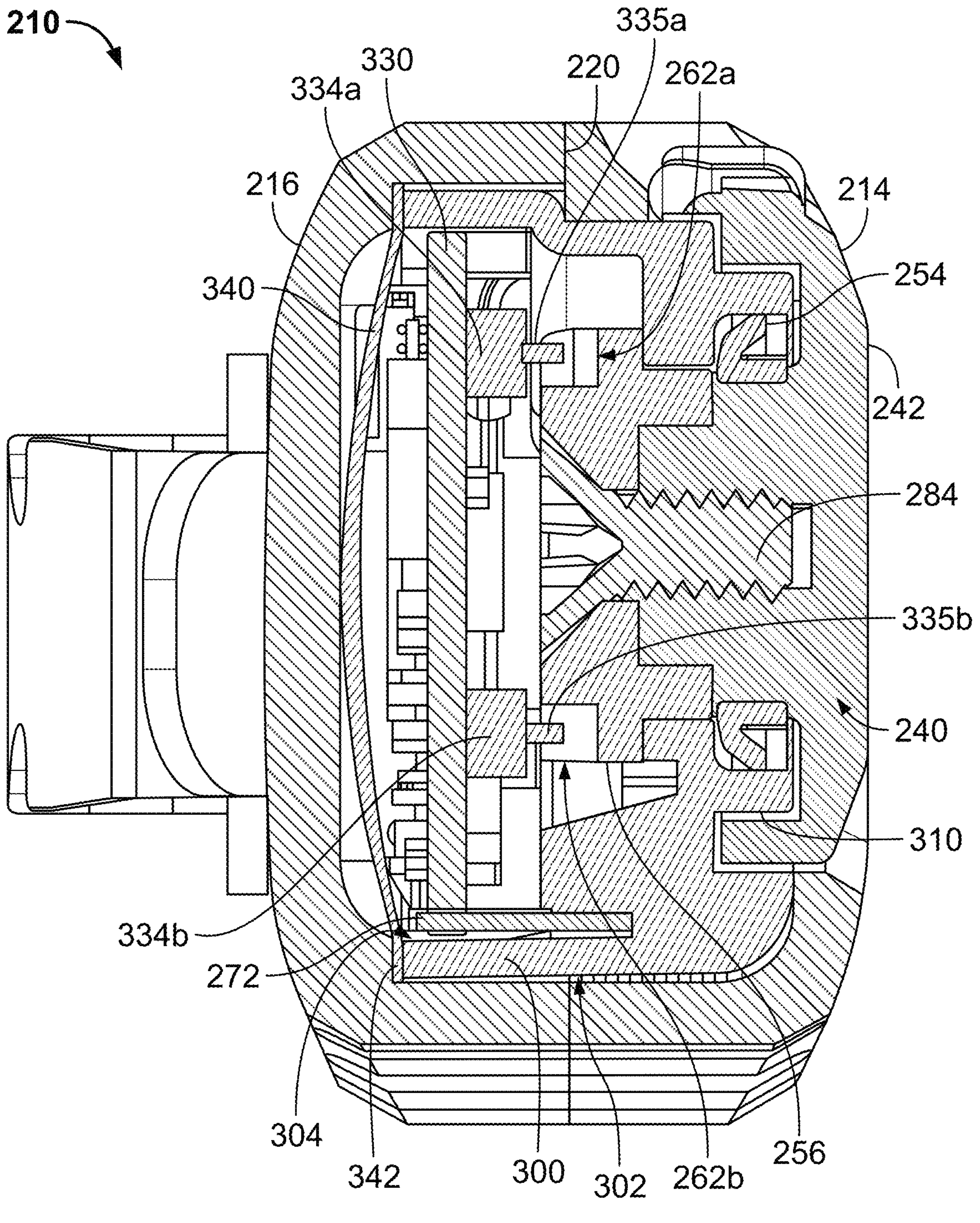
FIG. 15 is a cross sectional side view of the flashlight assembly of FIG. 9, taken along line 15-15 thereof.

In this embodiment, the fastener 284 that holds the switch assembly 240 together does not extend through the wheel 242, and is instead routed from the interior side of the switch assembly 240, where it passes through a hole 260 (which in this embodiment is not threaded) located in the center of the cam 256, through the center of the V-ring 254, and into a threaded hole 243 that is formed in the interior side of the wheel 242. As best seen in FIG. 12, the interior side of the cam 56 includes a ramped surface 257 that is complementary in shape to the head of the fastener 284, so that the head of the fastener 284 sits snugly and flush within the ramped surface 257—as seen in FIG. 14—when the switch assembly 240 is fully assembled. The threaded shaft of the fastener 284 engages with the threaded hole 243 in the wheel 242 to hold the switch assembly 240 together. In this embodiment, the interior side of the wheel 242 includes a protruding portion 241 that mates with a complementary-shaped indented portion 261 located in the cam 256 and two tabs (only tab 245 shown in the Figures) that interact with two complementary-shaped indented portions 255*a*,255*b* located interior to the indented portion 261 of the cam 256. The engagement of these parts, in addition to the friction applied thereto by the fastener 284, ensures that the cam 256 is rotationally fixed with respect to the wheel 242, such that as the wheel 242 is rotated by the user, the cam 256 changes the mode of the switch assembly 240 and, accordingly, the functional mode of the flashlight assembly 210.

Further, in this embodiment the positions in which the curved feet 276,280 of the spring 270 sit when the switch assembly 240 is in its TURBO position are not recessed into the body of the cam 256, but are instead smooth, ramped surfaces along which the curved feet 276,280 will slide such that they are returned to the two positions corresponding with the ON position (i.e., cam recesses 264B and 264E) when the user is not applying a sufficient amount of additional pressing force against the wheel 242.

In some embodiments according to the present disclosure, the subframe 100,300 may be comprised of a translucent plastic material, for example in a smoked gray color, which permits for a status light located interior to the subframe 100,300 to indicate a status of the flashlight assembly 10,210 to the user by allowing for some of the light generated by the status light (which may be located on the PCB assembly 130,330) to shine around the perimeter of the switch assembly 40,240. For example, the status light could output different colors or blink according to different patterns to indicate one or more of a battery charging, battery status, and/or mode selection status of the flashlight assembly 10,210.

The flashlight assemblies 10,210 according to the present disclosure may also incorporate a light output intensity selection feature by which the user could select a default luminance intensity for the light assembly 90,290. This light output intensity selection feature may be accessible only during an active charging state of the flashlight assembly 10,210, or in the alternative at any time. In one exemplary embodiment, the default output luminance for the ON mode may be selected by a user between low (level "A"), medium (level "B"), and high (level "C") output intensities, with an extra-high (level "D") output intensity—which may represent the highest-possible output intensity for the light assembly 90—being available in each mode when the switch assembly 40,240 is placed in the TURBO mode. Said another way, the output intensity pairings for the three selectable modes in the ON and TURBO modes, respectively, are A-D, B-D, and C-D. Other combinations of output intensity pairings between the selectable modes are also possible within the scope of this disclosure.

One exemplary method of selecting the default luminance intensity for the flashlight assembly 90,290 may be performed according to the following steps: while the flashlight assembly 90,290 is turned off and being charged, the status light will show a battery charging status (e.g., red color if the battery 138 is charging or green color if the battery 138 is fully charged); the user rotates the switch assembly 40,240 to its "ON" position, which will cause the status light to begin blinking, with the color or pattern of the blinking corresponding to the current default ON mode of the light assembly (e.g., red=low, yellow=medium, green=high); bumping the switch assembly 40,240 into the momentary "TURBO" position will cycle through the preset defaults, with each bump advancing one setting by showing the status light blink the next color in the cycle; and, once the desired default ON output level has been reached, the switch assembly 40,240 is rotated back to the "OFF" position, which saves the output selection mode and allows the flashlight assembly 90,290 to resume its normal charging process.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

REFERENCE NUMERALS

10 flashlight assembly
12 housing
14 first body
16 second body
18*a*-18*d* body screws
20 seam
22 switch recess
24 light aperture
26*a*-26*d* fastener holes
28*a*-28*d* threaded holes
30 maximum height
32 maximum width
40 switch assembly
42 wheel
46 clearance hole
48 finger ridge
50*a* protrusion
50*b* protrusion
52 collar
54 V-ring
56 cam
58 cam body
60 hole
62*a* circuit control recess
62*b* circuit control recess
63*a* surface
63*b* surface
64A cam recess

64B cam recess
64C cam recess
64D cam recess
64E cam recess
64F cam recess
70 spring
72 spring plate
74 first spring arm
76 first curved foot
78 second spring arm
80 second curved foot
82 projection
83*a*-83*c* projections
84 fastener
88 axis
90 flashlight assembly
92 heatsink
93 reflector
94 lens
96 O-ring
97 light emitting diode (LED) assembly
100 subframe
102 exterior
103 opening
104 interior volume
106 sealing surface
108 switch opening
110 stem
112 portion
114 light opening
116*a*-116*c* threaded holes
118 tail opening
120 universal serial bus (USB) assembly
122 USB printed control board (PCB)
124 USB housing
126 USB connector
130 PCB assembly
132*a*-132*c* fasteners
134*a* circuit element
134*b* circuit element
135*a* button
135*b* button
136 notch
138 battery
140 seal
142 perimeter
150 pocket clip
152 clip body
154 securement flange
156*a* fastener
156*b* fastener
210 flashlight assembly
212 housing
214 first body
216 second body
218*a*-218*d* body screws
220 seam
222 switch recess
224 light aperture
226*a*-226*d* fastener holes
228*a*-228*d* threaded holes
240 switch assembly
241 portion
242 wheel
243 threaded hole
245 tab
248 finger ridge
254 V-ring
255*a* indented portion
255*b* indented portion
256 cam
257 surface
260 hole
261 indented portion
262*a* circuit control recess
262*b* circuit control recess
263*a* surface
263*b* surface
264A cam recess
264B cam recess
264C cam recess
264D cam recess
264E cam recess
264F cam recess
270 spring
272 spring plate
274 first spring arm
276 first curved foot
278 second spring arm
280 second curved foot
284 fastener
290 flashlight assembly
294 lens
300 subframe
302 exterior
304 interior volume
308 switch opening
310 stem
314 light opening
330 PCB assembly
332*a*-332*c* fasteners
334*a* circuit element
334*b* circuit element
335*a* button
335*b* button
338 battery
340 seal
342 perimeter

What is claimed is:

1. A lighting device comprising:

a light source;

a power source; and a housing, the housing having an entirely non-circular cross-sectional shape, the housing further having a maximum height and a maximum width, the maximum height and the maximum width having dimensions in approximately a 5:3 ratio.

2. The lighting device of claim 1, the lighting device further comprising a switch assembly, the light source having a first state of operation and a second state of operation; wherein the switch assembly, the light source, and the power source are electrically coupled together, the switch assembly being rotatable to select between the first state of operation and the second state of operation of the light source.

3. The lighting device of claim 2, wherein the first state of operation of the light source is a constant-off state and the second state of operation of the light source is a constant-on state, wherein in the second state of operation the light source and power source interact such that light of a first intensity is emitted from the light source.

4. The lighting device of claim 1, the lighting device further comprising:

a subframe having an interior volume and a sealing surface that surrounds an opening in the subframe, the power source being located within the interior volume;

a seal having a perimeter, the perimeter being attached to the sealing surface such that the opening in the subframe is liquid and gas impermeable; and a vent that acts to prevent liquids from entering the interior volume, while permitting for gases to be released from the interior volume through the vent.

5. The lighting device of claim 4, wherein the opening has a non-circular shape.

6. The lighting device of claim 4, wherein the opening has a rectangular shape.

7. The lighting device of claim 4, wherein the subframe and the seal are comprised of a plastic material.

8. A lighting device-further comprising:

a housing having an entirely non-circular cross-sectional shape;

a light source having a first state of operation and a second state of operation;

a power source;

a switch assembly, wherein the switch assembly, the light source, and the power source are electrically coupled together, the switch assembly being positionable to select between the first state of operation and the second state of operation of the light source;

a subframe having an interior volume and a sealing surface that surrounds a first opening in the subframe, the power source being located within the interior volume;

a membrane having a perimeter, the perimeter of the membrane being attached to the sealing surface of the subframe such that the first opening in the subframe is sealed; and a vent that acts to prevent liquids from entering the interior volume via a second opening in the subframe, while permitting for gases to be released from the interior volume through the vent.

9. The lighting device of claim 8, wherein the first opening has a non-circular shape.

10. The lighting device of claim 8, wherein the first opening has a rectangular shape.

11. A lighting device comprising:

a housing having an entirely non-circular cross-sectional shape;

a power source;

a light source having a first state of operation and a second state of operation, wherein the first state of operation of the light source is a constant-off state and the second state of operation of the light source is a constant-on state, wherein in the second state of operation the light source and power source interact such that light of a first intensity is emitted from the light source;

a switch assembly, wherein the switch assembly, the light source, and the power source are electrically coupled together, the switch assembly being positionable to select between the first state of operation and the second state of operation of the light source;

a subframe having an interior volume and a sealing surface that surrounds a first opening in the subframe, the power source being located within the interior volume;

a membrane having a perimeter, the perimeter of the membrane being attached to the sealing surface of the subframe such that the first opening in the subframe is sealed; and a vent that acts to prevent liquids from entering the interior volume via a second opening in the subframe, while permitting for gases to be released from the interior volume through the vent.

12. The lighting device of claim 11, wherein the first opening has a non-circular shape.

13. The lighting device of claim 11, wherein the first opening has a rectangular shape.

* * * * *